United States Patent
Minami

(10) Patent No.: US 11,165,552 B2
(45) Date of Patent: Nov. 2, 2021

(54) CLOCK RECOVERY DEVICE, AN ERROR RATE MEASUREMENT DEVICE, A CLOCK RECOVERY METHOD, AND AN ERROR RATE MEASUREMENT METHOD

(71) Applicant: ANRITSU CORPORATION, Atsugi (JP)

(72) Inventor: Takanari Minami, Atsugi (JP)

(73) Assignee: ANRITSU CORPORATION, Atsugi (JP)

( * ) Notice: Subject to any disclaimer, the term of this patent is extended or adjusted under 35 U.S.C. 154(b) by 0 days.

(21) Appl. No.: 17/165,219

(22) Filed: Feb. 2, 2021

(65) Prior Publication Data

US 2021/0288783 A1    Sep. 16, 2021

(30) Foreign Application Priority Data

Mar. 13, 2020   (JP) .............................. JP2020-043696

(51) Int. Cl.
*H04L 27/02*   (2006.01)
*H04L 7/00*   (2006.01)

(52) U.S. Cl.
CPC ............ *H04L 7/0016* (2013.01); *H04L 27/02* (2013.01)

(58) Field of Classification Search
CPC .................................................. H04L 7/0016
See application file for complete search history.

(56) References Cited

U.S. PATENT DOCUMENTS

| | | | | |
|---|---|---|---|---|
| 7,260,155 B2* | 8/2007 | Stonick | ..................... | H04B 3/32 375/292 |
| 8,201,050 B2* | 6/2012 | Choi | ....................... | G06F 11/10 714/755 |
| 8,325,861 B2* | 12/2012 | Chang | ....................... | H03L 7/00 375/346 |
| 8,433,020 B2* | 4/2013 | Buchwald | ............. | H03L 7/0816 375/355 |
| 2005/0069067 A1* | 3/2005 | Zerbe | .................. | H04L 25/4917 375/353 |
| 2005/0259772 A1* | 11/2005 | Voutilainen | ........... | H04L 25/061 375/353 |
| 2011/0311008 A1* | 12/2011 | Slezak | .................... | H03M 9/00 375/353 |

(Continued)

FOREIGN PATENT DOCUMENTS

JP    3405916 B2    5/2003
JP    3976891 B2    9/2007

*Primary Examiner* — Qutbuddin Ghulamali
(74) *Attorney, Agent, or Firm* — Greer Burns & Crain Ltd.

(57) ABSTRACT

A clock recovery device (10), including: a signal conversion circuit (20) that sequentially converts two consecutive symbols of a 2n+1 value (n is a natural number) pulse amplitude modulation signal to one symbol of an NRZ (Non Return to Zero) signal; and a clock recovery circuit (30) that generates a recovery clock signal from the NRZ signal converted by the signal conversion circuit. The signal conversion circuit converts the two consecutive symbols: to 0, when a second symbol is n−1 or less; to 1, when the second symbol is n+1 or more; to 0, when a first symbol is n−1 or less and the second symbol is n; to 1, when a first symbol is n+1 or more and the second symbol is n; to a conversion result of previous two symbols, when both of the two consecutive symbols are n.

11 Claims, 11 Drawing Sheets

(56) References Cited

U.S. PATENT DOCUMENTS

2014/0119486 A1* 5/2014 Mendel .................. H04L 25/08
375/353
2016/0142200 A1* 5/2016 Lin ....................... H04L 7/0331
375/233
2017/0171001 A1* 6/2017 Minami ................. H04L 1/203

* cited by examiner

| PAM3 State | | ⇒ | Output State |
|---|---|---|---|
| Before Transition | After Transition | | |
| 2 | 2 | | 1 |
| 2 | 1 | | 1 |
| 2 | 0 | | 0 |
| 1 | 2 | | 1 |
| 1 | 1 | | X |
| 1 | 0 | | 0 |
| 0 | 2 | | 1 |
| 0 | 1 | | 0 |
| 0 | 0 | | 0 |

FIG.3

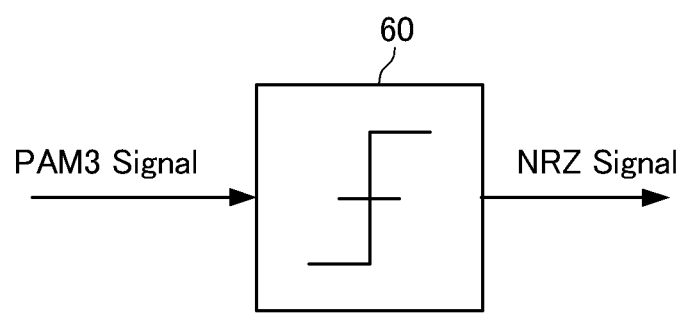
FIG.8 [PRIOR ART]

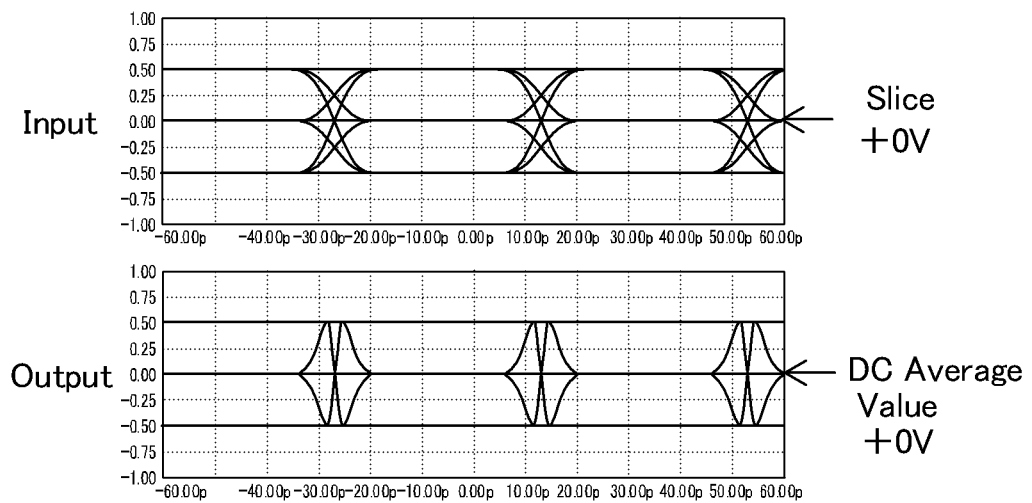
FIG.9A [PRIOR ART]

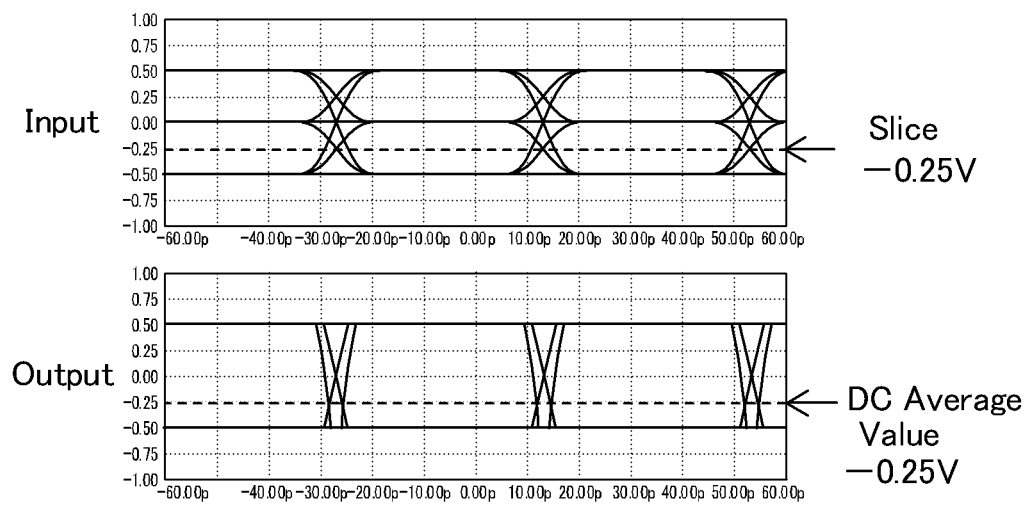
FIG.9B [PRIOR ART]

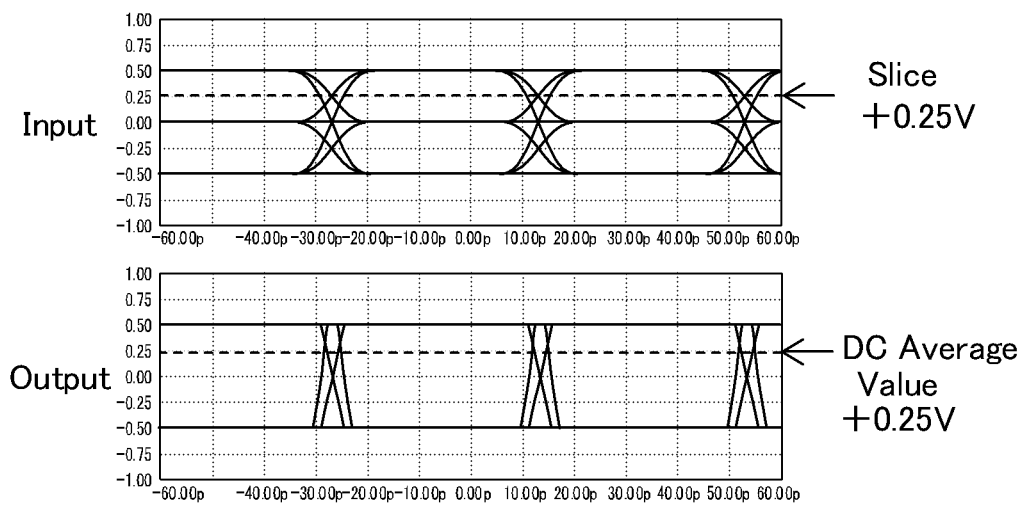
FIG.9C [PRIOR ART]

CLOCK RECOVERY DEVICE, AN ERROR RATE MEASUREMENT DEVICE, A CLOCK RECOVERY METHOD, AND AN ERROR RATE MEASUREMENT METHOD

CROSS-REFERENCE TO RELATED APPLICATIONS

This application claims Convention priority to Japanese Patent Application No. 2020-043696, filed Mar. 13, 2020, the entire contents of which are incorporated herein by reference.

FIELD OF THE INVENTION

The present invention relates to a clock recovery device, an error rate measurement device, a clock recovery method, and an error rate measurement method, particularly to a clock recovery device, an error rate measurement device, a clock recovery method, and an error rate measuring method for generating a recovery clock signal from a trinary pulse amplitude modulation (Pulse Amplitude Modulation 3: PAM3) signal.

BACKGROUND ART

In recent years, communication systems have been steadily increasing in speed. For example, in standards such as IEEE100G and 400G, in order to respond to ultra-high-speed bit rates, transmission by PAM4 (Pulse Amplitude Modulation 4) signal has been specified, rather than the conventional PAM2 (Pulse Amplitude Modulation 2) (NRZ (Non Return to Zero)) signal transmission. Since the PAM4 signal realizes four values with one symbol, while it is possible to realize twice the transmission amount as compared with the PAM2 signal, the SNR (Signal to Noise Ratio) cannot be obtained as compared with the PAM2 signal, due to the Eye opening being small. Therefore, the PAM3 signal, which is intermediate between the two, has begun to be studied. In the PAM3 signal, by realizing three values with one symbol, even though the transmission amount for one symbol is reduced to ¾ times as compared with the PAM4 signal, the SNR is theoretically improved by about 2.5 dB. This makes it possible to increase the transmission rate while maintaining the signal quality.

In recent years, many of the various communication devices constituting the communication system do not transmit the clock signal for synchronization, but transmit only the data signal, and the communication device on the receiving side is provided with a clock recovery circuit that recovers a clock recovery signal from the received data signal.

The PAM3 signal is a data signal having a trinary state of 0 level, 1 level, and 2 level. A method of clock recovery from this signal will be discussed hereinafter. If the PAM3 signal is inputted to the clock recovery circuit as it is, the change of the signal waveform becomes slow at the time of transition from 0 level or 2 level to 1 level, so that it is difficult to lock the phase comparator inside the clock recovery circuit. Therefore, it is considered to input the NRZ-ized signal, obtained by slicing between 0 level-1 level or 1 level-2 level by a limiting amplifier, to the clock recovery circuit.

FIG. 8 shows a configuration in which a PAM3 signal is converted to an NRZ signal by using a limiting amplifier 60 conventionally used for converting a PAM4 signal into an NRZ signal for clock recovery. FIGS. 9A to 9C show the results of simulating the input/output waveforms of the limiting amplifier 60. Here, it is assumed that a PAM3 signal of 25 Gbit/s and 1.0 Vpp is input to the limiting amplifier 60. At this time, the waveform, in which the mark ratio representing the rate at which 1 level appears in the NRZ signal outputted from the limiting amplifier 60 becomes ½, is the waveform in which the DC average value is 0.

FIG. 9A shows that the DC average value of the outputted waveform became +0V when the threshold voltage of the limiting amplifier 60 is set at the 1 level (0V) of the PAM3 signal. However, this output waveform does not have the waveform of the NRZ signal, since 1 level of the PAM3 signal has not been removed.

FIG. 9B shows that the DC average value of the outputted waveform became −0.25V when the threshold voltage of the limiting amplifier 60 is set to −0.25V between the 0 level (−0.5V) and the 1 level (0V) of the PAM3 signal. This output waveform has the waveform of the NRZ signal, since 1 level of the PAM3 signal has been removed, but the mark ratio is not 1/2.

FIG. 9C shows that the DC average value of the outputted waveform became +0.25V when the threshold voltage of the limiting amplifier 60 is set to +0.25V between the 1 level (0V) and the 2 level (+0.5V) of the PAM3 signal. This output waveform has the waveform of the NRZ signal, since 1 level of the PAM3 signal has been removed, but the mark ratio is not 1/2.

Thus, in the conversion of the PAM3 signal using the limiting amplifier 60, the trinary state of 0 level, 1 level, and 2 level cannot be evenly distributed to the binary state of 0 level and 1 level, so that a pattern with a mark ratio of 1/2 cannot be recovered from the waveform of the PAM3 signal. Further, no matter how the logic circuits are combined, the above-mentioned trinary state cannot be evenly distributed to the binary state. If such an NRZ signal with a biased mark ratio is used, there is a problem that clock recovery becomes difficult.

It should be noted that a method is known that enables clock recovery even with an NRZ signal having a biased mark ratio (see, for example, Patent Document 1). In this method, the result of phase comparison by the phase comparator is used for comparison with the ramp waveform of the same period as the master clock without passing it to the VCO (Voltage Controlled Oscillator), so that only the phase shift is perforated without changing the frequency, thereby avoiding the affect of the mark ratio. However, the options for a clock recovery circuit that supports high data rates are limited, and methods that depend on the internal configuration of such clock recovery circuits cannot always be adopted.

On the other hand, a method of encoding information of adjacent bits by using a phase comparator is known (see, for example, Patent Document 2). Considering the conversion from the PAM3 signal to the NRZ signal, the mark ratio when converting the trinary state of 0, 1, 2 to the binary state of 0, 1 is 1/3 (or 2/3). On the other hand, when converting the 9-valued state of 00,01,02,10,11,12,20,21,22 to the binary state of 0,1 in consideration of adjacent symbols, the mark ratio can be improved to 4/9 (or 5/9).

CITATION LIST

Patent Literature

[Patent Document 1] Japanese Patent No. 3976891
[Patent Document 2] Japanese Patent No. 3405916

SUMMARY OF THE INVENTION

Technical Problem

However, even if logic processing is to be performed or a phase comparator is to be used as in the methods disclosed in Patent Documents 1 and 2, there is a problem that a separate clock signal is required before inputting the PAM3 signal to the clock recovery circuit. This is because a clock signal cannot be prepared in advance for applications that require clock recovery.

Therefore, for example, in the above method of encoding the information of adjacent symbols, it is considered to perform logic processing using a fixed delay that does not require a clock signal, but in this case, there occurs a problem that the data rate that can be used is fixed.

The present invention has been made to solve such a conventional problem, and it is an object of the present invention to provide a clock recovery device, an error rate measurement device, a clock recovery method, and an error rate measuring method capable of easily performing clock recovery from an odd-value PAM signal having an arbitrary data rate including a PAM3 signal.

Means to Solve the Problems

In order to solve the above problems, the clock recovery device according to the present invention comprises: a signal conversion circuit that sequentially converts two consecutive symbols of a 2n+1 value (n is a natural number) pulse amplitude modulation signal to one symbol of an NRZ (Non Return to Zero) signal; and a clock recovery circuit that generates a recovery clock signal from the NRZ signal converted by the signal conversion circuit, wherein the signal conversion circuit converts the two consecutive symbols to 0, when a second symbol of the two consecutive symbols is n−1 or less, the signal conversion circuit converts the two consecutive symbols to 1, when the second symbol of the two consecutive symbols is n+1 or more, the signal conversion circuit converts the two consecutive symbols to 0, when a first symbol of the two consecutive symbols is n−1 or less and the second symbol is n, the signal conversion circuit converts the two consecutive symbols to 1, when a first symbol of the two consecutive symbols is n+1 or more and the second symbol is n, the signal conversion circuit converts the two consecutive symbols to a conversion result of previous two symbols, when both of the two consecutive symbols are n.

By this configuration, when sequentially converting two consecutive symbols in the 2n+1 value PAM signal to symbols of the NRZ signal, the clock recovery device according to the present invention preserves the previous conversion result when both of the two consecutive symbols are n. As a result, the clock recovery device according to the present invention can convert an odd value PAM signal of an arbitrary data rate, such as a PAM3 signal, to an NRZ signal having a mark ratio of 1/2, without depending on the configuration of the clock recovery circuit, eliminating the necessity of a clock signal for clock recovery. Further, the clock recovery device according to the present invention can easily recover the clock using the NRZ signal after conversion.

Further, the clock recovery device according to the present invention may be so configured that the signal conversion circuit sequentially converts two consecutive symbols of a three value pulse amplitude modulation (Pulse Amplitude Modulation 3) signal to one symbol of the NRZ signal, the signal conversion circuit converts the two consecutive symbols "00", "10", and "20" to 0, the signal conversion circuit converts the two consecutive symbols "02", "12", and "22" to 1, the signal conversion circuit converts the two consecutive symbols "01" to 0, the signal conversion circuit converts the two consecutive symbols "21" to 1, and the signal conversion circuit converts the two consecutive symbols "11" to the conversion result of the previous two symbols.

By this configuration, the clock recovery device according to the present invention can easily perform clock recovery from a PAM3 signal having an arbitrary data rate.

Further, the clock recovery device according to the present invention may be so configured to comprise: a signal conversion circuit that sequentially converts a 2n+1 value (n is a natural number) pulse amplitude modulation signal to an NRZ (Non Return to Zero) signal; and a clock recovery circuit that generates a recovery clock signal from the NRZ signal converted by the signal conversion circuit, wherein a lower limit threshold voltage is set between n−1 level voltage and n level voltage of the pulse amplitude modulation signal in the signal conversion circuit, an upper limit threshold voltage is set between n level voltage and n+1 level voltage of the pulse amplitude modulation signal in the signal conversion circuit, the signal conversion circuit outputs an output voltage corresponding to 0 level of the NRZ signal when the voltage of the pulse amplitude modulation signal is equal to or less than the lower limit threshold voltage, the signal conversion circuit outputs an output voltage corresponding to 1 level of the NRZ signal when the voltage of the pulse amplitude modulation signal is equal to or higher than the upper limit threshold voltage, the signal conversion circuit preserves the output voltage when the voltage of the pulse amplitude modulation signal is in a dead zone between the lower limit threshold voltage and the upper limit threshold voltage.

By this configuration, in the clock recovery device according to the present invention, when the 2n+1 value PAM signal is sequentially converted to the NRZ signal, the output voltage is preserved in the case that the voltage of the 2n+1 value PAM signal is in a dead zone between the lower limit threshold voltage Vth_1 and the upper limit threshold voltage Vth_h. As a result, the clock recovery device according to the present invention can convert an odd value PAM signal of an arbitrary data rate, such as a PAM3 signal, to an NRZ signal having a mark ratio of 1/2, without depending on the configuration of the clock recovery circuit, eliminating the necessity of a clock signal for clock recovery. Further, the clock recovery device according to the present invention can easily recover the clock using the NRZ signal after conversion.

Further, in the clock recovery device according to the present invention, the signal conversion circuit may be constituted by a hysteresis circuit.

By this configuration, the clock recovery device according to the present invention can easily perform clock recovery from an odd-value PAM signal having an arbitrary data rate including a PAM3 signal, by constituting the signal conversion unit by a hysteresis circuit, rather than a limiting amplifier.

Further, the error rate measurement device according to the present invention comprises: a signal reception unit that receives the pulse amplitude modulation signal; and an error rate calculation unit that calculates an error rate of the pulse amplitude modulation signal received by the signal receiving unit, wherein the signal reception unit includes any of the above clock recovery devices, and uses the recovery clock signal, generated from the pulse amplitude modulation signal by the clock recovery device, as an operation clock.

By this configuration, the error rate measurement device according to the present invention can receive a 2n+1 value PAM signal as a signal to be measured, and generate a recovered clock signal from the signal to be measured using any of the above clock recovery devices. Further, the error rate measurement device according to the present invention can use the generated recovery clock signal as an operation clock to convert the signal to be measured to symbol data and measure the error rate of the symbol data.

Further, the clock recovery method according to the present invention comprises: a signal conversion step to sequentially convert two consecutive symbols of a 2n+1 value (n is a natural number) pulse amplitude modulation signal to one symbol of an NRZ (Non Return to Zero) signal; and a clock recovery step to generate a recovery clock signal from the NRZ signal converted by the signal conversion step, wherein the signal conversion step converts the two consecutive symbols to 0, when a second symbol of the two consecutive symbols is n−1 or less, the signal conversion step converts the two consecutive symbols to 1, when the second symbol of the two consecutive symbols is n+1 or more, the signal conversion step converts the two consecutive symbols to 0, when a first symbol of the two consecutive symbols is n−1 or less and the second symbol is n, the signal conversion step converts the two consecutive symbols to 1, when a first symbol of the two consecutive symbols is n+1 or more and the second symbol is n, the signal conversion step converts the two consecutive symbols to a conversion result of previous two symbols, when both of the two consecutive symbols are n.

By this configuration, when sequentially converting two consecutive symbols in the 2n+1 value PAM signal to symbols of the NRZ signal, the clock recovery method according to the present invention preserves the previous conversion result when both of the two consecutive symbols are n. As a result, the clock recovery method according to the present invention can convert an odd value PAM signal of an arbitrary data rate, such as a PAM3 signal, to an NRZ signal having a mark ratio of 1/2, without depending on the configuration of the clock recovery circuit, eliminating the necessity of a clock signal for clock recovery. Further, the clock recovery method according to the present invention can easily recover the clock using the NRZ signal after conversion.

Further, the clock recovery method according to the present invention may be so configured that the signal conversion step sequentially converts the two consecutive symbols of a three value pulse amplitude modulation (Pulse Amplitude Modulation 3) signal to one symbol of the NRZ signal, the signal conversion step converts the two consecutive symbols "00", "10", and "20" to 0, the signal conversion step converts the two consecutive symbols "02", "12", and "22" to 1, the signal conversion step converts the two consecutive symbols "01" to 0, the signal conversion step converts the two consecutive symbols "21" to 1, the signal conversion step converts the two consecutive symbols "11", to the conversion result of previous two symbols.

By this configuration, the clock recovery method according to the present invention can easily perform clock recovery from a PAM3 signal having an arbitrary data rate.

Further, the clock recovery method according to the present invention comprises: a signal conversion step to sequentially convert a 2n+1 value (n is a natural number) pulse amplitude modulation signal to an NRZ (Non Return to Zero) signal; and a clock recovery step (S4) to generate a recovery clock signal from the NRZ signal converted by the signal conversion step, wherein the clock recovery method further comprises a lower limit threshold voltage setting step (S1) to set up a lower limit threshold voltage between n−1 level voltage and n level voltage of the pulse amplitude modulation signal, the clock recovery method further comprises an upper limit threshold voltage setting step (S2) to set up an upper limit threshold voltage between n level voltage and n+1 level voltage of the pulse amplitude modulation signal, the signal conversion step outputs an output voltage corresponding to 0 level of the NRZ signal when the voltage of the pulse amplitude modulation signal is equal to or less than the lower limit threshold voltage, the signal conversion step outputs an output voltage corresponding to 1 level of the NRZ signal when the voltage of the pulse amplitude modulation signal is equal to or higher than the upper limit threshold voltage, the signal conversion step preserves the output voltage when the voltage of the pulse amplitude modulation signal is in a dead zone between the lower limit threshold voltage and the upper limit threshold voltage.

By this configuration, in the clock recovery method according to the present invention, when the 2n+1 value PAM signal is sequentially converted to the NRZ signal, the output voltage is preserved in the case that the voltage of the 2n+1 value PAM signal is in a dead zone between the lower limit threshold voltage and the upper limit threshold voltage. As a result, the clock recovery method according to the present invention can convert an odd value PAM signal of an arbitrary data rate, such as a PAM3 signal, to an NRZ signal having a mark ratio of 1/2, without depending on the configuration of the clock recovery circuit, eliminating the necessity of a clock signal for clock recovery. Further, the clock recovery method according to the present invention can easily recover the clock using the NRZ signal after conversion.

Further, the error rate measuring method according to the present invention comprises: a signal reception step to receive a pulse amplitude modulation signal; and an error rate calculation step to calculate an error rate of the pulse amplitude modulation signal received by the signal receiving step, wherein the signal reception step includes any one of the clock recovery methods described above, and uses the recovery clock signal, generated from the pulse amplitude modulation signal by the clock recovery step, as an operation clock.

By this configuration, the error rate measurement method according to the present invention can receive a 2n+1 value PAM signal as a signal to be measured and generate a recovered clock signal from the signal to be measured using any of the above clock recovery devices. Further, the error rate measurement method according to the present invention can convert the signal under test to symbol data, using the generated clock signal as an operation clock, and measure an error rate of this symbol data.

Effect of the Invention

The present invention provides a clock recovery device, an error rate measurement device, a clock recovery method, and an error rate measuring method capable of easily performing clock recovery from an odd-value PAM signal having an arbitrary data rate including a PAM3 signal.

BRIEF DESCRIPTION OF THE DRAWINGS

FIG. 3 is a table showing the input state and output state related to AM3 signal of a signal conversion circuit included in the clock recovery device according to the first embodiment of the present invention.

FIG. 8 is a block diagram showing a configuration to convert a PAM3 signal to an NRZ signal using a limiting amplifier.

FIGS. 9A, 9B, and 9C are diagrams showing the simulation results of the input/output waveforms of the limiting amplifier. FIG. 9A shows the waveform of the input signal and output signal when the threshold voltage of the limiting amplifier is 0V. FIG. 9B shows the waveform of the input signal and output signal when the threshold voltage of the limiting amplifier is −0.25V. FIG. 9C shows the waveform of the input signal and output signal when the threshold voltage of the limiting amplifier is +0.25V.

DETAILED DESCRIPTION OF EMBODIMENTS

Hereinafter, embodiments of the clock recovery device and the clock recovery method according to the present invention will be described with reference to the drawings.

First Embodiment

Figure 1:
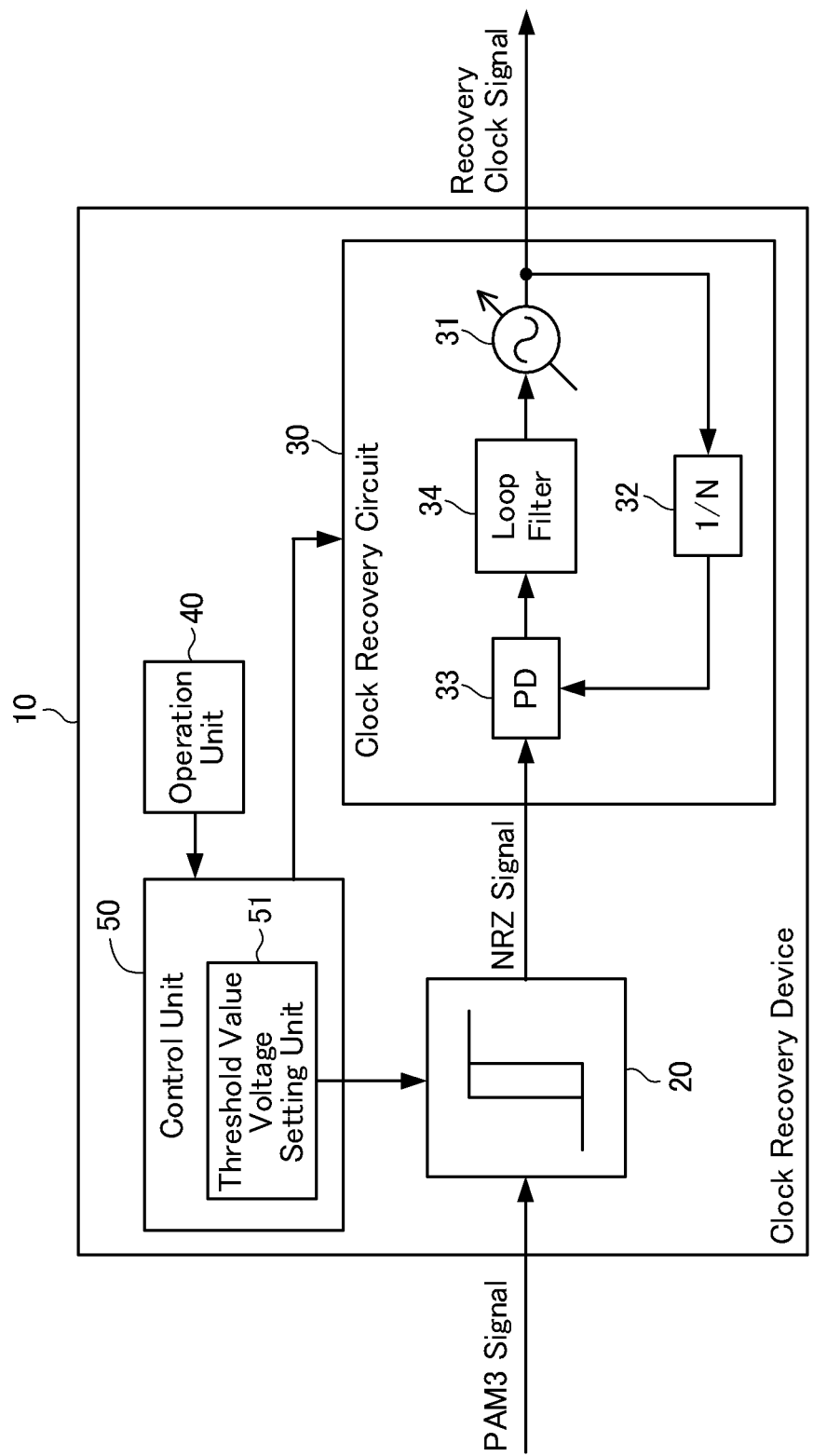
FIG. 1 is a block diagram showing a configuration of a clock recovery device according to the first embodiment of the present invention.

As shown in FIG. 1, the clock recovery device 10 according to the first embodiment of the present invention includes a signal conversion circuit 20, a clock recovery circuit 30, an operation unit 40, and a control unit 50.

The signal conversion circuit 20 converts an input 2n+1 value (n is a natural number) pulse amplitude modulation (PAM) signal to an NRZ signal, and is constituted by a hysteresis circuit represented, for example, by a Schmitt trigger circuit or the like. Here, the levels that the 2n+1 value PAM signal can take are 0 level, 1 level, . . . , and 2n level.

In the signal conversion circuit 20, a lower limit threshold voltage $Vth\_1$ is set between the n−1 level voltage and the n level voltage of the 2n+1 value PAM signal, and an upper limit threshold voltage $Vth\_h$ is set between the n level voltage and the n+1 level voltage of the 2n+1 value PAM signal, by a threshold voltage setting unit 51 described later. The signal conversion circuit 20 outputs an output voltage corresponding to the 0 level of the NRZ signal when the voltage of the 2n+1 value PAM signal is equal to or less than the lower limit threshold voltage $Vth\_1$. Further, the signal conversion circuit 20 outputs an output voltage corresponding to 1 level of the NRZ signal when the voltage of the 2n+1 value PAM signal is equal to or higher than the upper limit threshold voltage $Vth\_h$. Further, the signal conversion circuit 20 preserves the output voltage when the voltage of the 2n+1 value PAM signal is in a dead zone between the lower limit threshold voltage $Vth\_1$ and the upper limit threshold voltage $Vth\_h$.

In other words, the signal conversion circuit 20 sequentially converts two consecutive symbols of a 2n+1 value PAM signal to symbols of an NRZ signal. Specifically, the signal conversion circuit 20 converts the two consecutive symbols to 0 when the second symbol of the two consecutive symbols is n−1 or less, and converts the two consecutive symbols to 1 when the second symbol of the two consecutive symbols is n−1 or more. Further, the signal conversion circuit 20 converts the two consecutive symbols to 0 when the first symbol of the two consecutive symbols is n−1 or less and the second symbol is n, and converts the two consecutive symbols to 1 when the first symbol of the two consecutive symbols is n+1 or more and the second symbol is n. Further, the signal conversion circuit 20 converts the two consecutive symbols to a conversion result of previous two symbols, when both of the two consecutive symbols are n.

Figure 2:
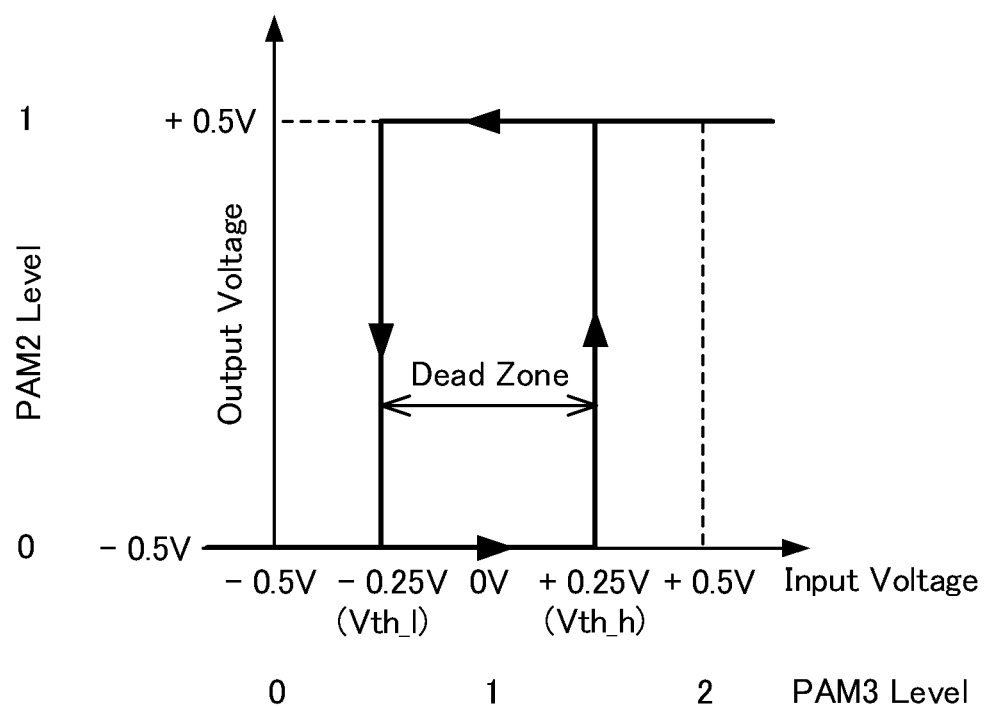
FIG. 2 is a figure which shows an example of a hysteresis property of a signal conversion circuit included in the clock recovery device according to the first embodiment of the present invention.

FIG. 2 is a diagram showing an example of hysteresis property with respect to the PAM3 signal (n=1) of the signal conversion circuit 20. In the example of FIG. 2, the 0 level voltage of the PAM3 signal is −0.5V, the 1 level voltage is 0V, and the 2 level voltage is 0.5V. Further, the lower limit threshold voltage $Vth\_1$ is set between the 0 level voltage and the 1 level voltage, and the upper limit threshold voltage $Vth\_h$ is set between the 1 level voltage and the 2 level voltage. A dead zone is a voltage range including 1 level voltage from the lower limit threshold voltage $Vth\_1$ to the upper limit threshold voltage $Vth\_h$, which is −0.25V to +0.25V in the example of FIG. 2. On the other hand, the 0 level voltage of the NRZ signal of the output signal is −0.5V, and the 1 level voltage of the NRZ signal of the output signal is 0.5V.

FIG. 3 is a table showing an input state and an output state regarding the PAM3 signal of the signal conversion circuit 20 when the hysteresis property of the signal conversion circuit 20 is a property having a dead zone as shown in FIG. 2. This means that the signal conversion circuit 20 sequentially converts two consecutive symbols of the PAM3 signal (before and after the transition in the table) to a symbols of the NRZ signal. To be specific, the signal conversion circuit 20 converts the two consecutive symbols "00", "10", and "20" to 0, and converts the two consecutive symbols "02", "12", and "22". to 1. Further, the signal conversion circuit 20 converts the two consecutive symbols "01" to 0, and converts the two consecutive symbols "21" to 1. Further, the signal conversion circuit 20 converts the two consecutive symbols "11" to the conversion result of the previous two symbols.

As described above, the transition from the 1 level to the 1 level of the PAM3 signal further preserves the previous state and becomes "don't care", so that the nine input states shown in FIG. 3 are evenly distributed into two output states consisting of 0 level and 1 level. Thus, the signal conversion circuit 20 can convert the PAM3 signal to an NRZ signal having a mark ratio of 1/2.

Figure 4:
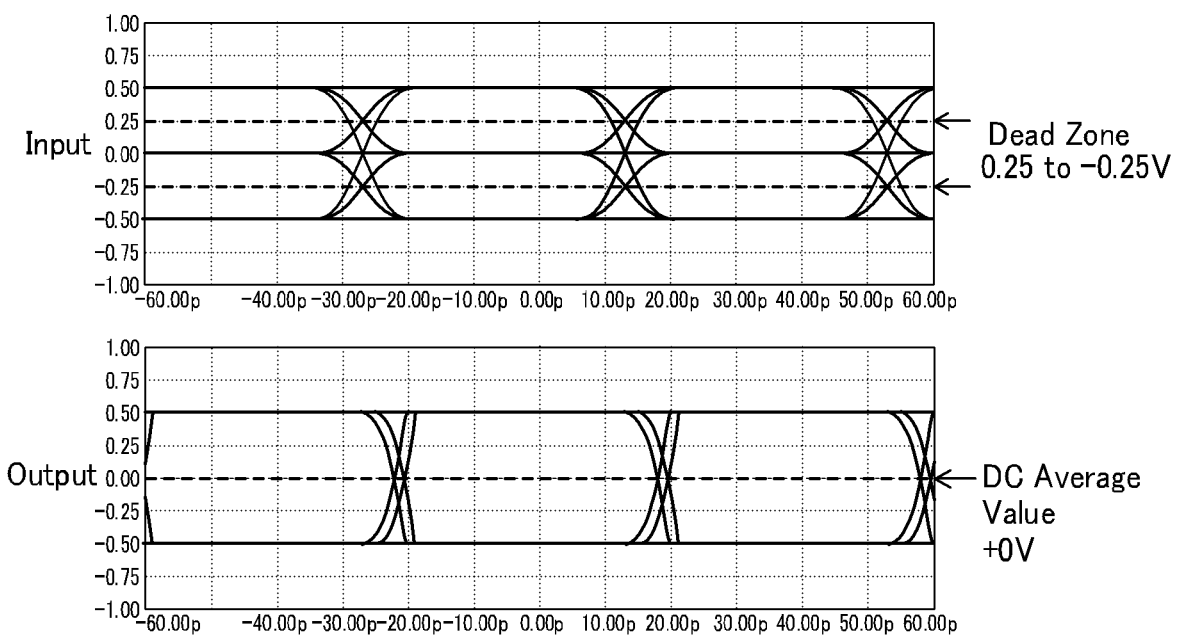
FIG. 4 is a figure which shows the simulation result of the output waveform of a signal conversion circuit included in the clock recovery device according to the first embodiment of the present invention.

FIG. 4 shows the result of simulating the input/output waveform of the signal conversion circuit 20 when the hysteresis property of the signal conversion circuit 20 is a property having a dead zone as shown in FIG. 2. Here, it is assumed that a PAM3 signal of 25 Gbit/s and 1.0 Vpp is input to the signal conversion circuit 20. At this time, the waveform in which the mark ratio is 1/2 is the waveform in which the DC average value is 0. In conventional methods, the PAM3 signal is converted to an NRZ signal having a biased mark ratio as shown in FIG. 9, however, according to the signal conversion circuit 20 of the present embodiment, the PAM3 signal can be converted to an NRZ signal of mark ratio 1/2 as shown in FIG. 4.

The clock recovery circuit 30 shown in FIG. 1 generates a recovery clock signal from the NRZ signal converted by the signal conversion circuit 20. The clock recovery circuit 30 is constituted by, for example, a phase locked loop (PLL) circuit including a VCO 31, a frequency divider 32, a phase detector (PD) 33, and a loop filter 34.

The VCO 31 outputs an output signal having a frequency corresponding to the voltage of the signal input from the loop filter 34. To be specific, the VCO 31 outputs a signal having a frequency substantially proportional to the voltage of the output signal of the loop filter 34, as a clock recovery signal.

The frequency divider 32 frequency-converts the recovery clock signal outputted from the VCO 31 at a predetermined frequency conversion ratio (frequency division ratio N) and outputs the frequency to the PD 33. Here, N is a real number of 1 or more.

The PD33 is constituted by, for example, an exclusive sum of logic (XOR) circuit, and outputs an error signal pulse having a width proportional to the phase difference between the output signal of the frequency divider 32 and the NRZ signal inputted from the signal conversion circuit 20, as an output signal.

The loop filter 34 is constituted by, for example, a lag read filter, and allows the output signal of the PD 33 with a required loop bandwidth to pass and input it to the VCO 31. The output signal of the PD 33 is integrated (smoothed) by the loop filter 34 and becomes the control voltage of the VCO 31.

The control unit 50 is constituted by, for example, a microcomputer or a personal computer including a CPU (Central Processing Unit), ROM (Read Only Memory), RAM (Random Access Memory), HDD (Hard Disk Drive), and the like, and controls the operation of each of the above units constituting the clock recovery device 10. Further, the control unit 50 can configure at least a part of the threshold voltage setting unit 51 by software by transferring a predetermined program stored in the ROM or the like to the RAM and executing the program. At least a part of the threshold voltage setting unit 51 can be configured by a digital circuit such as an FPGA (Field Programmable Gate Array) or an ASIC (Application Specific Integrated Circuit). Alternatively, at least a part of the threshold voltage setting unit 51 can be configured by appropriately combining hardware processing by a digital circuit and software processing by a predetermined program.

The threshold voltage setting unit 51 sets the lower limit threshold voltage $Vth\_1$ and the upper limit threshold voltage $Vth\_h$ in the signal conversion circuit 20. The lower limit threshold voltage $Vth\_1$ and the upper limit threshold voltage $Vth\_h$ can be set by, for example, an operation input to the operation unit 40 by the user.

The operation unit 40 is for receiving operation input by the user, and is constituted by, for example, a touch panel provided on the surface of the display screen of the display device. Alternatively, the operating unit 40 may be configured to include an input device such as a keyboard or mouse. Further, the operation unit 40 may be configured by an external control device that performs remote control by a remote command or the like. The operation input to the operation unit 40 is detected by the control unit 50. For example, the user can arbitrarily specify the lower limit threshold voltage $Vth\_1$, the upper limit threshold voltage $Vth\_h$, and the like of the signal conversion circuit 20, by the operation unit 40.

Figure 5:
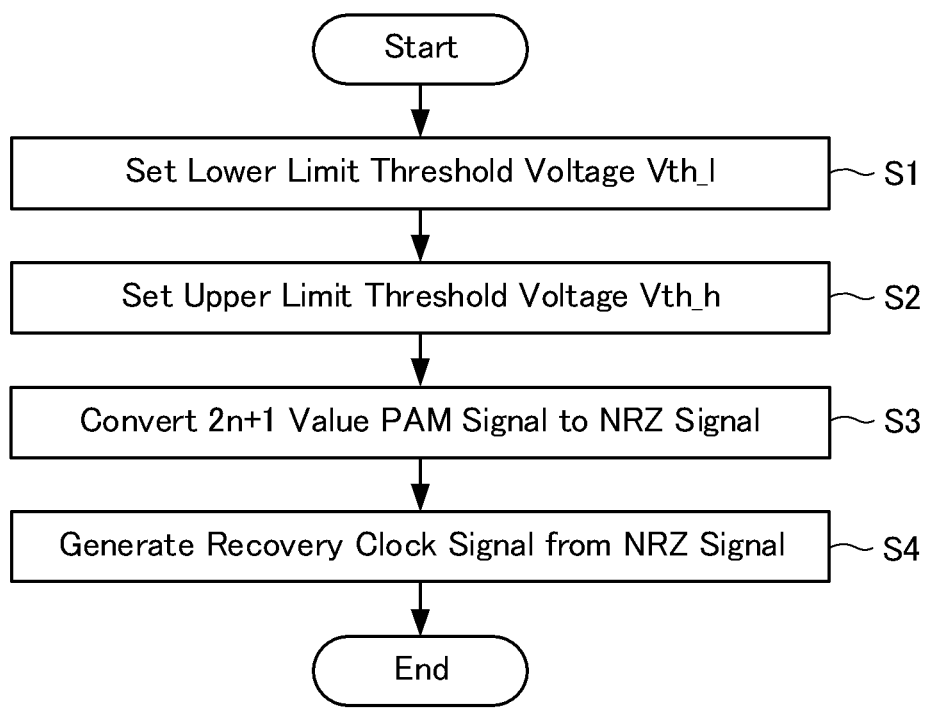
FIG. 5 is a flowchart showing the processing of a clock recovery method using the clock recovery device according to the first embodiment of the present invention.

Hereinafter, an example of the processing of the clock recovery method using the clock recovery device 10 of the present embodiment will be described with reference to the flowchart of FIG. 5.

First, the threshold voltage setting unit 51 sets the lower limit threshold voltage $Vth\_1$ between the n−1 level voltage and the n level voltage of the 2n+1 value PAM signal in the signal conversion circuit 20 (lower limit threshold voltage setting step S1).

Next, the threshold voltage setting unit 51 sets the upper limit threshold voltage $Vth\_h$ between the n level voltage and the n+1 level voltage of the 2n+1 value PAM signal in the signal conversion circuit 20 (upper limit threshold voltage setting step S2).

Next, the signal conversion circuit 20 outputs an output voltage corresponding to the 0 level of the NRZ signal when the voltage of the 2n+1 value PAM signal is equal to or less than the lower limit threshold voltage $Vth\_1$. Further, the signal conversion circuit 20 outputs an output voltage corresponding to 1 level of the NRZ signal when the voltage of the 2n+1 value PAM signal is equal to or more than the upper limit threshold voltage $Vth\_h$. Further, the signal conversion circuit 20 preserves the output voltage when the voltage of the 2n+1 value PAM signal is in the dead zone between the lower limit threshold voltage $Vth\_1$ and the upper limit threshold voltage $Vth\_h$ (signal conversion step S3). As a result, the 2n+1 value PAM signal is convened to the NRZ signal. In other words, the signal conversion step S3 sequentially converts the two consecutive symbols of the 2n+1 value PAM signal into symbols of the NRZ signal.

To be specific, in the signal conversion step S3, the two consecutive symbols are converted to 0 when the second symbol of the two consecutive symbols is n−1 or less, and the two consecutive symbols are converted to 1 when the second symbol of the two consecutive is n+1 or more. Further, in the signal conversion step S3, the two consecutive symbols are converted to 0 when the first symbol of the two consecutive symbols is n−1 or less and the second symbol is n, and the two consecutive symbols are converted to 0 when the first symbol of the two symbols is n+1 or more and the second symbol is n. Further, in the signal conversion step S3, the two consecutive symbols are converted to the conversion result of the previous two symbols when the two consecutive symbols are n.

Next, the clock recovery circuit 30 generates a recovery clock signal from the NRZ signal converted in the signal conversion step S3 (clock recovery step S4).

As described above, when sequentially converting two consecutive symbols in the 2n+1 value PAM signal to symbols of the NRZ signal, the clock recovery device 10 according to the present embodiment preserves the previous conversion result when both of the two consecutive symbols are n. As a result, the clock recovery device 10 according to the present embodiment can convert an odd value PAM signal of an arbitrary data rate, such as a PAM3 signal, to an NRZ signal having a mark ratio of 1/2, without depending on the configuration of the clock recovery circuit 30, eliminating the necessity of a clock signal for clock recovery. Further, the clock recovery device 10 according to the present embodiment can easily recover the clock using the NRZ signal after conversion.

Further, in the clock recovery device 10 according to the present embodiment, when the 2n+1 value PAM signal is sequentially converted to the NRZ signal, the output voltage is preserved in the case that the voltage of the 2n+1 value PAM signal is in a dead zone between the lower limit threshold voltage $Vth\_1$ and the upper limit threshold voltage $Vth\_h$. As a result, the clock recovery device 10 according to the present embodiment can convert an odd value PAM signal of an arbitrary data rate, such as a PAM3 signal, to an NRZ signal having a mark ratio of 1/2, without depending on the configuration of the clock recovery circuit 30, eliminating the necessity of a clock signal for clock recovery. Further, the clock recovery device 10 according to the present embodiment can easily recover the clock using the NRZ signal after conversion.

Further, the clock recovery device 10 according to the present embodiment can easily perform clock recovery from an odd-value PAM signal having an arbitrary data rate including a PAM3 signal, by constituting the signal conversion unit 20 by a hysteresis circuit, rather than a limiting amplifier.

Second Embodiment

Subsequently, the error rate measurement device and the error rate measuring method according to the second embodiment of the present invention will be described with reference to the drawings. The same components as those in the first embodiment are designated by the same reference numerals, and the description thereof will be omitted as appropriate. Further, description of the same operation as that of the first embodiment will be omitted as appropriate.

Figure 6:
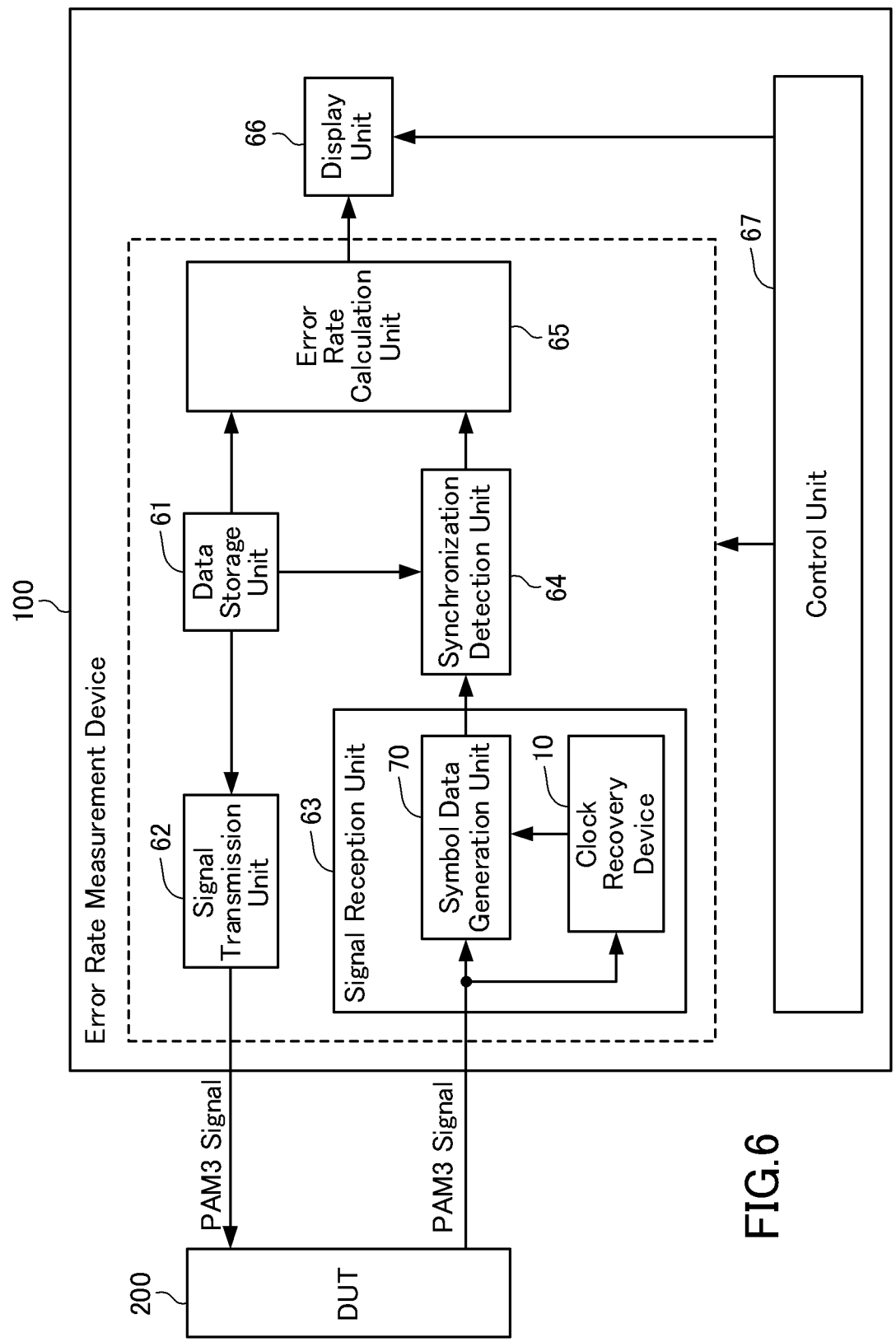
FIG. 6 is a block diagram showing a configuration of an error rate measurement device according to the second embodiment of the present invention.

As shown in FIG. 6, the error rate measurement device 100 according to the second embodiment that measures the error rate of the signal under test transmitted from the device under test (DUT) 200 is provided with a data storage unit 61, a signal transmission unit 62, a signal reception unit 63, a synchronization detection unit 64, an error rate calculation unit 65, a display unit 66, and a control unit 67.

The data storage unit 61 is constituted by a memory such as a RAM, and is stored with reference symbol data (hereinafter, also referred to as "reference data") in advance. Here, the symbol data is data indicating 2n+1 levels, which are from 0 level to 2n level that can be taken by the 2n+1 value PAM signal. For example, the symbol data of the PAM3 signal consists of "0", "1", and "2".

The signal transmission unit 62 transmits a reference signal representing the reference data read from the data storage unit 61 to the DUT 200. At this time, the DUT 200 receives the reference signal transmitted from the signal transmitting unit 62 and transmits the received reference signal as a signal to be measured to the signal reception unit 63. This means that the DUT 200 transmits a 2n+1 value PAM signal (for example, a PAM3 signal) as a signal to be measured.

The signal reception unit 63 receives the analog signal to be measured transmitted from the DUT 020, and outputs the symbol data of the received signal to be measured to the synchronization detection unit 64, and includes the clock recovery device 10 of the first embodiment and a symbol data generation unit 70.

The clock recovery device 10 generates a recovery clock signal from the signal to be measured transmitted from the DUT 200. The symbol data generation unit 70 uses the recovery clock signal outputted from the clock recovery device 10 as an operation clock to generate symbol data of the signal to be measured transmitted from the DUT 200. For example, the symbol data generation unit 70, having a plurality of 0/1 determination devices, ca the signal to be measured transmitted from the DUT 200 at the timing of the recovery clock signal, by being inputted with the recovery clock signal from the clock recovery device 10. The recovery clock signal outputted from the clock recovery device 10 may be used in each of the units constituting the error rate measurement device 100, not limited to the symbol data generation unit 70.

The synchronization detection unit 64 synchronizes the reference data read from the data storage unit 61 with the symbol data of the signal to be measured outputted from the signal reception unit 63. And then, the synchronization detection unit 64 outputs the symbol data of the signal to be measured that has been synchronized to the error rate calculation unit 65.

The error rate calculation unit 65 detects an error symbol of the symbol data of the signal to be measured by sequentially comparing the symbol data of the signal to be measured outputted from the synchronization detection unit 64 with the reference data stored in the data storage unit 61, and calculates an error rate of the symbol data of the signal to be measured.

The display unit 66 is constituted by a display device such as an LCD or a CRT, and displays various display contents such as an error rate of symbol data calculated by the error rate calculation unit 65 in accordance with a control signal outputted from the control unit 67. Further, the display unit 66 displays an operation target such as a button for setting various conditions, a soft key, a pull-down menu, and a text box in accordance with the control signal outputted from the control unit 67.

The control unit 67 is constituted by, for example, a microcomputer or a personal computer including a CPU, ROM, RAM, HDD, and the like, and controls the operation of each of the above units constituting the error rate measurement device 100. Further, the control unit 67 can configure at least a part of the error rate calculation unit 65 by software by transferring a predeteimined program stored in the ROM or the like to the RAM and executing the program. At least a part of the error rate calculation unit 65 can be configured by a digital circuit such as an FPGA (Field Programmable Gate Array) or an ASIC (Application Specific Integrated Circuit). Alternatively, at least a part of the error rate calculation unit 65 can be configured by appropriately combining hardware processing by a digital circuit and software processing by a predetermined program.

Figure 7:
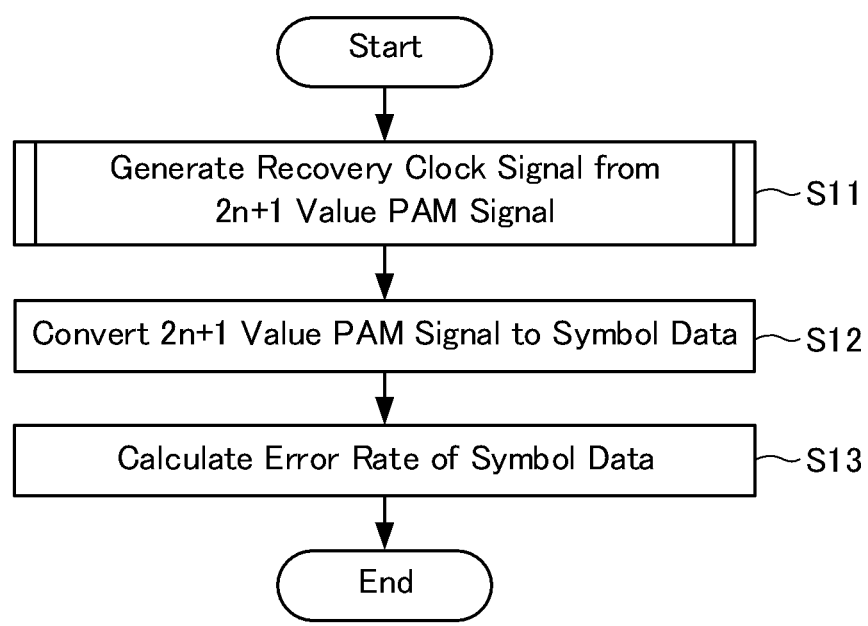
FIG. 7 is a flowchart showing a processing of an error rate measuring method using an error rate measurement device according to the second embodiment of the present invention.

Hereinafter, an example of the processing of the error rate measurement method of the present embodiment will be described with reference to the flowchart of FIG. 7.

First, the clock recovery device 10 executes the processes of steps S1 to S4 of the first embodiment, receives the 2n+1 value PAM signal transmitted from the DUT 200, and generates a recovery clock signal (signal reception step S11).

Next, the symbol data generation unit 70 uses the recovery clock signal outputted from the clock recovery device 10 as an operation clock to generate symbol data of the 2n+1 value PAM signal received from the DUT 200 (signal reception step S12).

Next, the error rate calculation unit 65 calculates the error rate of the symbol data of the 2n+1 value PAM signal generated in step S12 (error rate calculation step S13).

As described above, the error rate measurement device 100 according to the present embodiment can receive the 2n+1 value PAM signal transmitted from the DUT 200 as the signal to be measured, and generate the recovery signal from the signal to be measured, using the signal recovery device 10 according to the first embodiment. Further, the error rate measurement device 100 according to the present embodiment can use the generated recovery clock signal as an operation clock to convert the signal to be measured to symbol data and measure the error rate of this symbol data.

EXPLANATION OF REFERENCE NUMERALS

10 Clock Recovery Device
20 Signal Conversion Circuit
30 Clock Recovery Circuit
31 VCO
32 Frequency Divider
33 PD
34 Loop Filter
40 Operation Unit
50, 67 Control Unit
51 Threshold Voltage Setting Unit
61 Data Storage Unit
62 Signal Transmission Unit
63 Signal Reception Unit
64 Synchronization Detection Unit
65 Error Rate Calculation Unit
66 Display Unit
70 Symbol Data Generation Unit
100 Error Rate Measurement Device
200 DUT

What is claimed is:

1. A clock recovery device, comprising
a signal conversion circuit that sequentially converts two consecutive symbols of a 2n+1 value (n is a natural number) pulse amplitude modulation signal to one symbol of an NRZ (Non Return to Zero) signal; and
a clock recovery circuit that generates a recovery clock signal from the NRZ signal converted by the signal conversion circuit, wherein
the signal conversion circuit converts the two consecutive symbols to 0, when a second symbol of the two consecutive symbols is n−1 or less,
the signal conversion circuit converts the two consecutive symbols to 1, when the second symbol of the two consecutive symbols is n+1 or more,
the signal conversion circuit converts the two consecutive symbols to 0, when a first symbol of the two consecutive symbols is n−1 or less and the second symbol is n,
the signal conversion circuit converts the two consecutive symbols to 1, when a first symbol of the two consecutive symbols is n+1 or more and the second symbol is n,
the signal conversion circuit converts the two consecutive symbols to a conversion result of previous two symbols, when both of the two consecutive symbols are n.

2. The clock recovery device according to claim 1, wherein
the signal conversion circuit sequentially converts two consecutive symbols of a three value pulse amplitude modulation (Pulse Amplitude Modulation 3) signal to one symbol of the NRZ signal,
the signal conversion circuit converts the two consecutive symbols "00", "10", and "20" to 0,
the signal conversion circuit converts the two consecutive symbols "02", "12", and "22" to 1,
the signal conversion circuit converts the two consecutive symbols "01" to 0,
the signal conversion circuit converts the two consecutive symbols "21" to 1, and the signal conversion circuit converts the two consecutive symbols "11" to the conversion result of the previous two symbols.

3. A clock recovery device comprising:
a signal conversion circuit that sequentially converts a 2n+1 value (n is a natural number) pulse amplitude modulation signal to an NRZ (Non Return to Zero) signal; and
a clock recovery circuit that generates a recovery clock signal from the NRZ signal converted by the signal conversion circuit, wherein
a lower limit threshold voltage is set between n−1 level voltage and n level voltage of the pulse amplitude modulation signal in the signal conversion circuit,
an upper limit threshold voltage is set between n level voltage and n+1 level voltage of the pulse amplitude modulation signal in the signal conversion circuit,
the signal conversion circuit outputs an output voltage corresponding to 0 level of the NRZ signal when the voltage of the pulse amplitude modulation signal is equal to or less than the lower limit threshold voltage,
the signal conversion circuit outputs an output voltage corresponding to 1 level of the NRZ signal when the voltage of the pulse amplitude modulation signal is equal to or higher than the upper limit threshold voltage,
the signal conversion circuit preserves the output voltage when the voltage of the pulse amplitude modulation signal is in a dead zone between the lower limit threshold voltage and the upper limit threshold voltage.

4. The clock recovery device according to of claim 3, wherein
the signal conversion circuit is constituted by a hysteresis circuit.

5. An error rate measurement device, comprising:
a signal reception unit that receives a pulse amplitude modulation signal; and
an error rate calculation unit that calculates an error rate of the pulse amplitude modulation signal received by the signal receiving unit, wherein
the signal reception unit includes the clock recovery device according to claim 1, and uses the recovery clock signal, generated from the pulse amplitude modulation signal by the clock recovery device, as an operation clock.

6. An error rate measurement device, comprising:
a signal reception unit that receives a pulse amplitude modulation signal; and
an error rate calculation unit that calculates an error rate of the pulse amplitude modulation signal received by the signal receiving unit, wherein
the signal reception unit includes the clock recovery device according to claim 3, and uses the recovery clock signal, generated from the pulse amplitude modulation signal by the clock recovery device, as an operation clock.

7. A clock recovery method, comprising:
a signal conversion step to sequentially convert two consecutive symbols of a 2n+1 value (n is a natural number) pulse amplitude modulation signal to one symbol of an NRZ (Non Return to Zero) signal; and
a clock recovery step generate a recovery clock signal from the NRZ signal converted by the signal conversion step, wherein
the signal conversion step converts the two consecutive symbols to 0, when a second symbol of the two consecutive symbols is n−1 or less,
the signal conversion step converts the two consecutive symbols to 1, when the second symbol of the two consecutive symbols is n+1 or more, the signal conversion step converts the two consecutive symbols to 0, when a first symbol of the two consecutive symbols is n−1 or less and the second symbol is n, the signal conversion step converts the two consecutive symbols to 1, when a first symbol of the two consecutive symbols is n+1 or more and the second symbol is n, the signal conversion step converts the two consecutive symbols to a conversion result of previous two symbols, when both of the two consecutive symbols are n.

8. The clock recovery method according to claim 7, wherein the signal conversion step sequentially converts the two consecutive symbols of a three value pulse amplitude modulation (Pulse Amplitude Modulation 3) signal to one symbol of the NRZ signal, the signal conversion step converts the two consecutive symbols "00", "10", and "20" to 0, the signal conversion step converts the two consecutive symbols "02", "12", and "22" to 1, the signal conversion step converts the two consecutive symbols "01" to 0, the signal conversion step converts the two consecutive symbols "21" to 1, the signal conversion step converts the two consecutive symbols "11", to the conversion result of previous two symbols.

9. A clock recovery method, comprising:

a signal conversion step to sequentially convert a 2n+1 value (n is a natural number) pulse amplitude modulation signal to an NRZ (Non Return to Zero) signal; and a clock recovery step to generate a recovery clock signal from the NRZ signal converted by the signal conversion step, wherein the clock recovery method further comprises a lower limit threshold voltage setting step to set up a lower limit threshold voltage between n−1 level voltage and n level voltage of the pulse amplitude modulation signal, the clock recovery method further comprises an upper limit threshold voltage setting step to set up an upper limit threshold voltage between n level voltage and n+1 level voltage of the pulse amplitude modulation signal, the signal conversion step outputs an output voltage corresponding to 0 level of the NRZ signal when the voltage of the pulse amplitude modulation signal is equal to or less than the lower limit threshold voltage, the signal conversion step outputs an output voltage corresponding to 1 level of the NRZ signal when the voltage of the pulse amplitude modulation signal is equal to or higher than the upper limit threshold voltage, the signal conversion step preserves the output voltage when the voltage of the pulse amplitude modulation signal is in a dead zone between the lower limit threshold voltage and the upper limit threshold voltage.

10. An error rate measurement method, comprising:

a signal reception step to receive a pulse amplitude modulation signal; and an error rate calculation step to calculate an error rate of the pulse amplitude modulation signal received by the signal reception step, wherein the signal reception step includes the clock recovery step according to claim 7, and uses the recovery clock signal, generated from the pulse amplitude modulation signal by the clock recovery step, as an operation clock.

11. An error rate measurement method, comprising:

a signal reception step to receive a pulse amplitude modulation signal; and an error rate calculation step to calculate an error rate of the pulse amplitude modulation signal received by the signal receiving step, wherein the signal reception step includes the clock recovery step according to claim 9, and uses the recovery clock signal, generated from the pulse amplitude modulation signal by the clock recovery step, as an operation clock.

* * * * *